US011029130B2

United States Patent
Rees et al.

(10) Patent No.: US 11,029,130 B2
(45) Date of Patent: Jun. 8, 2021

(54) MISSION PLANNING FOR WEAPONS SYSTEMS

(71) Applicant: MBDA UK LIMITED, Stevenage (GB)

(72) Inventors: Gareth Stanley Rees, Bristol (GB); Andrew Philip Walls, Bristol (GB); Alex Martin Robinson, Bristol (GB); Stephen Vincent Sargent, Bristol (GB); Nathan Rees Potter, Bristol (GB); Leigh Moody, Bristol (GB)

(73) Assignee: MBDA UK Limited, Stevanage (GB)

( * ) Notice: Subject to any disclaimer, the term of this patent is extended or adjusted under 35 U.S.C. 154(b) by 0 days.

(21) Appl. No.: 16/614,857

(22) PCT Filed: May 17, 2018

(86) PCT No.: PCT/GB2018/051338
§ 371 (c)(1),
(2) Date: Nov. 19, 2019

(87) PCT Pub. No.: WO2018/215738
PCT Pub. Date: Nov. 29, 2018

(65) Prior Publication Data
US 2020/0208945 A1    Jul. 2, 2020

(30) Foreign Application Priority Data

May 25, 2017 (EP) ...................................... 17172972
May 25, 2017 (GB) ...................................... 1708408

(51) Int. Cl.
*G06G 7/80* (2006.01)
*F41G 7/00* (2006.01)
*G06N 3/08* (2006.01)

(52) U.S. Cl.
CPC ............... *F41G 7/007* (2013.01); *G06N 3/08* (2013.01)

(58) Field of Classification Search
CPC .......... F41G 7/007; F41G 7/006; F41G 7/002; F41G 9/002
(Continued)

(56) References Cited

U.S. PATENT DOCUMENTS 5,751,609 A * 5/1998 Schaefer, Jr. ............. G01P 5/00
                                                            700/38
2010/0174514 A1    7/2010 Melkumyan et al.

FOREIGN PATENT DOCUMENTS

CN    106200655 A    12/2016
GB    2522110 A    7/2015
(Continued)

OTHER PUBLICATIONS

Quinonero-Candela, Joaquin, "A Unifying View of Sparse Approximate Gaussian Process Regression", Journal of Machine Learning Research (2005), vol. 6, pp. 1939-1959.
(Continued)

*Primary Examiner* — Karl D Frech
(74) *Attorney, Agent, or Firm* — Scully, Scott, Murphy & Presser, PC

(57) ABSTRACT

A mission planning method for use with a weapon is disclosed. The method comprises: obtaining a first training data set describing the performance of the weapon; using the first training data set and a Gaussian Process (GP) or Neural Network to obtain a first surrogate model giving a functional approximation of the performance of the weapon; and providing the first surrogate model to a weapons system for use in calculating a performance characteristic of the weapon during combat operations.

16 Claims, 3 Drawing Sheets

(58) Field of Classification Search
USPC .................. 235/417, 400, 404, 407, 411
See application file for complete search history.

(56) References Cited

FOREIGN PATENT DOCUMENTS

| WO | WO 00/36362 A1 | 6/2000 |
|----|----------------|--------|
| WO | WO 2008/129435 A2 | 10/2008 |

OTHER PUBLICATIONS

International Search Report dated Aug. 2, 2018 issued in PCT/GB2018/051338.
European Search Report dated Nov. 28, 2017 issued in EP 17172972.6.
GB Search Report dated Nov. 20, 2017 issued in GB 1708408.8.
Song, Kyungwoo et al., "Data-driven ballistic coefficient learning for future state prediction of high-speed vehicles", 19th International Conference on Information Fusion (Jul. 5, 2016), Heidelberg, Germany, pp. 17-24.
Rasmussen, Carl Edward et al., "Gaussian Processes for Machine Learning (GPML) Toolbox", Journal of Machine Learning Research (Dec. 1, 2010), vol. 11, MIT Press, Cambridge, MA, US, pp. 3011-3015.
Lee, Chiawei, "Determining the Accuracy of Launch Acceptability Regions", 40th International SFTE Symposium and 19th SFTE European Chapter Symposium (Jan. 1, 2010), pp. 98-112.
Nicholson, D., "Defence Applications of Agent-Based Information Fusion", The Computer Journal (Feb. 1, 2011), vol. 54, No. 2, pp. 263-273.
International Preliminary Report on Patentability together with the Written Opinion of the International Searching Authority from related International Application No. PCT/GB2018/051338, dated Nov. 26, 2019.

* cited by examiner

MISSION PLANNING FOR WEAPONS SYSTEMS

FIELD OF THE INVENTION

The present invention concerns mission planning for weapons systems. More particularly, but not exclusively, this invention concerns methods of mission planning that use Gaussian Process (GP) or Neural Network functional approximations to produce a surrogate model for use in determining one or more weapons performance characteristics during operations. The invention also concerns weapons systems comprising a processor programmed with a surrogate model produced using such a method and a computer software product programmed with a surrogate model produced using such a method.

BACKGROUND OF THE INVENTION

Typically, during combat operations a weapons system or platform will provide an indication to the operator regarding the capability of the weapon, for example the ability of a missile, to reach a particular target.

It is possible to accurately model the behaviour of a given weapon in a variety of situations using detailed kinematic models, and this is often done during the design phase for a weapons system. However, such models are time consuming to run, and require extensive computer processing power, rendering them unsuitable for deployment with most weapons systems in the field which may have only limited computing power. Furthermore, in order to be of use during a combat scenario, the information provided to the operator regarding the capability of the weapons system must be updated regularly and in near real time. Even in systems with less limited computing resources, the weapons system may not be able to provide a sufficiently accurate indication of weapon capability within the necessary time frame using a kinematic model.

In order to address this issue, the kinematic model may be simplified by removing one or more terms. However, this will reduce the accuracy of the prediction which could lower the perceived performance of the weapon (e.g. an operator will receive an indication that a given target cannot be reached, even if in the physical world it can). Altering the kinematic model in this way may also require extensive reprogramming of the weapons system and the cost associated with rewriting a complex software code. Finally, it may be that for security or commercial reasons it is undesirable to provide a detailed kinematic model of a weapons systems behaviour to an end user.

In an alternative method, the kinematic model may be used to produce a look up table which provides information on a particular capability of the weapon for a given combination of one or more parameters. However, it will be appreciated that where several parameters are involved in determining the capability of the weapon the size and complexity of the look up table, and the amount of computing power required to use it, increases significantly. On the other hand, reducing the number of parameters to reduce the computational resources required for a prompt indication of weapon capability may lead to a loss of accuracy.

The present invention seeks to mitigate the above-mentioned problems. Alternatively or additionally, the present invention seeks to provide an improved mission planning method for predicting the capability of a weapon during combat operations.

SUMMARY OF THE INVENTION

The present invention provides, according to a first aspect, a mission planning method for use with a weapon. The method may comprise a step of obtaining a training data set describing the performance of the weapon. The method may comprise a step of using the training data and a Gaussian Process (GP) or Neural Network to obtain a surrogate model which gives a functional approximation of the performance of the weapon. The method may comprise providing the surrogate model to a weapons system for use in calculating a performance characteristic of the weapon during combat operations.

The surrogate model produced by the GP or Neural Network may be simpler than a detailed kinematic model to programme, and may require less storage space and/or less processing power in order to run. Using a GP or Neural Network to produce a surrogate model that is then deployed with the weapons system may therefore allow for an accurate and rapid calculation of weapon performance during combat operations by a weapons system having limited computing power. References to mission planning in the present application are to be understood as references to command and control operations also.

Gaussian Process (GP) and Neural Networks are known methods of obtaining a functional approximation to the continuous function underlying a noisy data set and will not be discussed in detail here. Further information regarding GPs may be found in "Gaussian Process for Machine Learning" by Rasmussen C. E & Williams C. K. I, The MIT Press, 2006, ISBN 026218253X, and "Gaussian Process Regression Analysis for Functional Data" by Shin, J. Q and Choi, T., CRC Press, 2011, ISBN 9781439837733. Further information on Neural Networks may be found in "Neural Networks for Pattern Recognition", by Bishop, C. M., Oxford University Press, 2005, ISBN 019853642.

A performance characteristic may be defined as a quantitative description of the capability of the weapon. For example the performance characteristic may indicate whether the weapon can reach a given target, or the region from which a weapon must be launched in order for the weapon to have a pre-determined likelihood of reaching a given target. The performance characteristic may be a function of the engagement geometry (e.g. launcher position, target position, launch platform altitude, target altitude, launch platform speed, launch platform heading), the prevailing environmental conditions (e.g. wind, temperature, pressure) and weapon-system calculated engagement parameters (e.g. impact pitch/dive angle, motor start time, location of entry-to-terminal (ETP) point). In the case of a moving target, the performance characteristic may become a function of target motion parameters such as position, speed and heading. The performance characteristic may further be a function of user specified constrains such as demanded missile impact heading, cruise altitude, specified way-points and run-in distance. Thus, the or each performance characteristic may be a function of more than one, for example more than four, for example more than eight parameters.

The surrogate model may be configured to calculate the Launch Success Zone (LSZ) limits of a weapon. An LSZ may be defined as the ranges the weapon can dynamically achieve as a function of the prevailing engagement geometry. The surrogate model may be configured to calculate the Launch Acceptability Regions (LARs) of a weapon. The LARs may be defined as a parameter space in which a weapon can be launched to reach a specific target. The surrogate model may be configured to calculate the footprint of a weapon. The footprint may be defined as the area that a weapon can reach given its kinematic characteristics and the initial conditions. The surrogate model may be configured to calculate the aerodynamic drag of the weapon and/or to provide a trajectory prediction for an enemy weapon.

The training data may comprise data giving the value of one or more performance characteristics over a parameter space. The training data may comprise a plurality of values for one or more performance characteristics and a corresponding combination of parameters that results in each of said values. The step of obtaining a training data set may comprise running a kinematic model. The method may comprise running the kinematic model a plurality of times to obtain results over a predetermined engagement parameter space. As well as describing the motion of the weapon, the kinematic model may comprise one or more random disturbances, for example wind force. The method may comprise running a kinematic model including a random disturbance a plurality of times, for example as part of a Monte Carlo method.

The surrogate model may comprise a regression function configured to approximate the function underlying the training data. The method may further comprise the step of calculating a performance characteristic of the weapon using the surrogate model. The method may comprise executing a playback algorithm configured to run the surrogate model in order to calculate one or more performance characteristics of the weapon. The playback algorithm may be configured to calculate the value of the performance characteristic for a given combination of input parameters using the regression model. The input parameters may comprise the parameters representing the current operations situation. The weapons system may comprise a processor. The step of calculating the performance characteristic(s) may be carried out by said processor.

In the case that a GP is used, the surrogate model may comprise a covariance function, for example a squared exponential covariance function, a Matern covariance function, a polynomial covariance function or other covariance function. The surrogate model may further comprise a set of hyper-parameters. The method may comprise the step of generating such a covariance function and/or a set of hyper-parameters. The method may comprise providing said covariance function and said hyper-parameters to the weapons system. The method may further comprise using the covariance function in combination with Automatic Relevance Detection (ARD). It may be that the GP is sparse approximation. The method may comprise the step of providing a set of inducing points (also sometimes known as pseudo-inputs) to the weapons system for use with the surrogate model. Thus, the surrogate model may further comprise a set of inducing points. The method may further comprise the step of generating a set of inducing points using the GP and providing said inducing points to the weapons system. The method may comprise the step of generating a set of weighted values. Each weighted value may be the output of the underlying function at an induction point as calculated using a covariance function with an appropriate weighting applied. The method may comprise providing said weighted values to the weapons system. Thus, the surrogate model may further comprise a set of weighted values. A GP may be a particularly advantageous method of producing the surrogate model as a GP also provides a prediction of the uncertainty associated with the functional approximation it produces. The GP used may be the Fully Independent Training Conditional algorithm, as described in, for example, "A unifying View of Sparse Approximate Gaussian Process Regression" by Quinonero-Candela J. & Rasmussen C. E., Journal of Machine Learning Research, Vol. 6, pp 1939-1959, 2005, and available as part of GPML Matlab Code version 4.0.

In the case that a Neural Network is used, the surrogate model may comprise an activation function or a basis function. The surrogate model may further comprise a set of Neural Network parameters. The method may comprise the step of generating a set of Neural Network parameters using a Neural Network and providing said Neural Network parameters and an activation function or a basis function to the weapons system.

The method may comprise launching a weapon in dependence on the performance characteristic(s) calculated by the surrogate model. For example, the method may comprise launching a weapon when the results of the surrogate model indicate that the weapon is within a LAR, and/or the target is within a LSZ. Alternatively, in the case that the weapon is an enemy weapon, the method may comprise carrying out a defensive action, for example an evasive action in dependence on the performance characteristic(s) calculated by the surrogate model. It will be appreciated that in the case that the surrogate model is configured to predict the behaviour of an enemy weapon it is not necessary for the surrogate model to be provided to weapons system, it may instead be provided to a friendly asset for use in defense of said asset or another friendly asset.

The method may comprise obtaining a training data set and using a GP to obtain a functional approximation of the behaviour of a weapon based on that training data set. The method may further comprise using the GP to obtaining a measure of the uncertainty associated with that approximation. The method may comprise generating additional training data in dependence on the uncertainty associated with the GP approximation. Using a GP during the generation of the training data may allow a reduction in the computational effort associated with generation of said data by altering the density of the data to reflect changes in behaviour and/or uncertainty. The method may comprise running the kinematic model to generate further training data in a region of higher than average uncertainty. The method may comprise running the kinematic model to generate further training data in a region where the functional approximation obtaining using the GP indicates a more rapid than average change in weapon performance over a given parameter range.

The method may comprise the step of obtaining a plurality of training data sets. Each training data set may be applicable to a pre-defined combination of parameters, hereafter known as an applicability zone. Thus, each applicability zone may corresponding to a pre-defined parameter space. The method may comprise running a kinematic model for a plurality of points (i.e. combinations of parameters) located within the applicability zone. The method may comprise running a kinematic model for a plurality of points (i.e. combinations of parameters) located adjacent to, but outside, the applicability zone. Running the model for points immediately outside the applicability zone may improve the accuracy of the surrogate model produced using that data set when predicating performance characteristics at the edges of the zone. The method may comprise using each training data set and a Gaussian Process (GP) or Neural Network to obtain a surrogate model comprising a functional approximation of the performance of the weapon within the corresponding applicability zone. Thus, the method may comprise generating a plurality of surrogate models using a GP or Neural Network, each surrogate model corresponding to a different training data set (and therefore a different applicability zone). The quality of a GP or Neural Network approximation may vary over the parameter space. Using a plurality of different surrogate models may allow more accurate prediction of different behaviour in different regions of the parameter space. The method may comprise providing the plurality of surrogate models to the weapons system for use in calculating the performance characteristics of the weapon during combat operations. During combat operations, the method may comprise identifying the applicability zone corresponding to the current engagement parameters. The method may comprise selecting a surrogate model from the plurality of surrogate models in dependence on the applicability zone so identified. The method may comprise using the surrogate model so selected to calculate a performance characteristic of the weapon. Using the applicability zones to divide the parameter space into different areas may allow for faster calculation of the performance characteristic, as only the induction points relating to the current applicability zone need be considered at any one time.

The method may therefore comprise the steps of obtaining a second training data set describing the performance of the weapon in a second, different, parameter space (or applicability zone) to the first training data set; using the second training data set and a Gaussian Process (GP) or Neural Network to obtain a second, different, surrogate model giving a functional approximation of the performance of the weapon in the second parameter space; and providing the first and second surrogate models to a weapons platform for use in calculating a performance characteristic of the weapon in a first and the second parameter space (or applicability zone) during combat operations. The method may comprise, during combat operations, selecting the first or second surrogate model in dependence on the current situation (i.e. the current parameters of the engagement) and using the surrogate model so selected to calculate a performance characteristic of the weapon. The method may comprise obtaining further training data sets, each further training data set corresponding to another parameter space (or applicability zone). Thus, the surrogate model may comprise more than two applicability zones.

The method may comprise applying one or more correctors to the output of the surrogate model. The corrector may be a linear multiplier, a bias, an offset, a minimum value or a maximum value. In the case that one or more applicability zones are used, a different corrector, or set of correctors may be applied to each zone. Applying a corrector to the output of the surrogate model may allow for differences in the overall performance of the weapon when it is integrated onto the weapons platform to be taken into account without having to make extensive software changes. Correctors of this kind may also be used to more easily alter the indicated performance of the weapon to suit operational, training or commercial requirements. Thus, the use of correctors, particularly in combination with applicability zones, may provide a more flexible surrogate model.

The step of generating the training data and/or obtaining the surrogate model may be carried out by one or more computer processors that are separate from the weapons system. The step of calculating a performance characteristic of the weapon may be carried out by a processor forming part of the weapons system, for example one or more processors mounted on the weapon, for example the missile and/or the launcher. The step of calculating a performance characteristic of the weapon may be carried out by a processor forming part of the control system of the weapons platform. The method may comprise using a first set of one or more processors to run the kinematic model to generate the training data and/or to train the GP or Neural Network to generate the surrogate model. The first set of processors may be located on the ground, for example in a research facility. The method may comprise using a second set of one or more processors to calculate one or more performance characteristic(s) using the surrogate model. The processors of the second set may be located on a mobile weapon system. Thus, the step of obtaining the training data, and the step of calculating the performance characteristics may be carried out in physically separate locations and/or by different processors. There may be a significant time delay, for example a delay of more than one month, for example more than six months, for example more than one year, between the step of using the training data set and a GP or Neural Network to obtain a surrogate model and using said surrogate model to calculate a weapon performance characteristic.

The method may comprise a step of preparing the training data for use in the GP process or Neural Network. This step may comprise formatting the functional data from the kinematic model into pairs comprising a set of input parameters and the corresponding value of the function (i.e. the performance characteristic) to be approximated.

The step of obtaining the surrogate model may comprise comparing the performance characteristics predicted by the model with those given by the training data. In the case that the variation between the predicted performance characteristics and those given by the training data fall outside a predetermined threshold the method may comprise generating additional training data and re-running the GP or Neural Network to obtain an updated surrogate model.

The weapon may be a missile, for example a surface-to-surface, air-to-surface, surface-to-air, air-to-air or anti-satellite missile. The weapon may be a guided bomb, a torpedo or space-fired missile, an Electronic Warfare (EW) effector and/or a Laser Directed Energy Weapon (LDEW).

The weapons system may comprise a weapons platform. The weapon system may comprise the weapon. In use, prior to launch, the weapon may be mounted on the weapons platform, for example the weapon may be mounted on a launcher mounted on the weapons platform. The weapons platform may be a mobile weapons platform, for example an aircraft, a ship or a ground vehicle, for example a truck.

According to a second aspect of the invention there is provided a weapons system comprising a processor programmed with software configured to calculate a performance characteristic of a weapon of the weapons system using a functional approximation comprising a surrogate model produced using a GP or Neural Network.

The processor may be located on the weapon, for example a missile, the launcher or the weapons platform. In the case that the processor is mounted on the weapons platform the processor may form part of the command and control system of the weapons platform. For example, the processor may be programmed with software configured to carry out command and control functions for the weapons platform. In the case that the processor is mounted on a missile, the processor may be programmed with software configured to carry out guidance functions for the missile.

According to a third aspect of the invention there is provided a missile comprising a processor programmed with software configured to calculate a performance characteristic of a weapon of the weapons system using a functional approximation comprising a surrogate model produced using a GP or Neural Network.

According to a fourth aspect of the invention there is provided a weapons system comprising a processor programmed with software configured to carry out the method of the first, or any other, aspect of the present invention.

According to a fifth aspect of the invention there is provided a computer software product for loading onto a processor associated with a weapons system, wherein the software product is configured to carry out the method of the first, or any other, aspect of the present invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
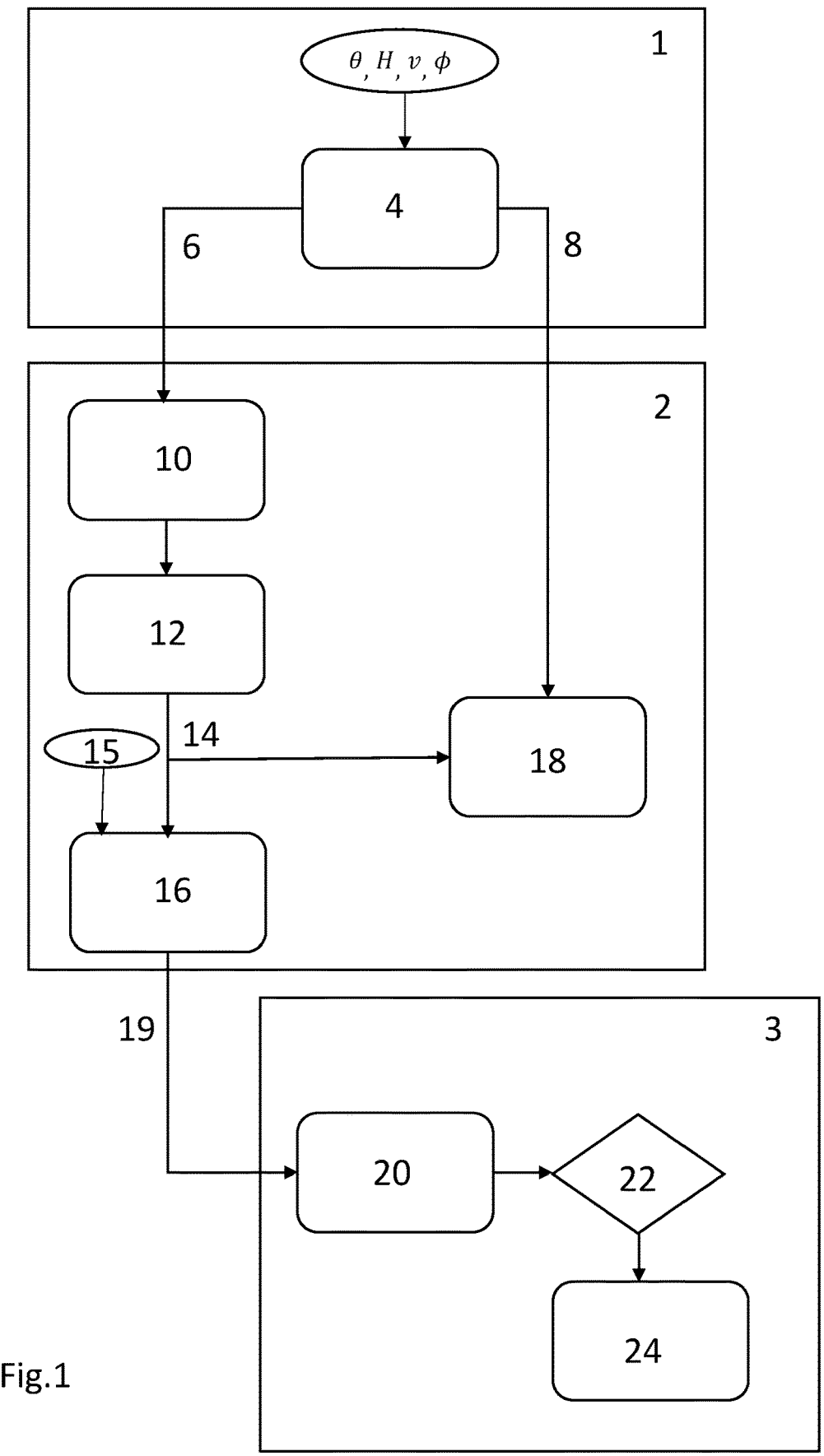
FIG. 1 shows a mission planning process according to a first embodiment of the invention.

FIG. 1 shows a process for calculating the Launch Acceptability Region (LAR) of a missile in accordance with a first example embodiment of the invention. At the highest level the process comprises three stages (in order); training data generation 1; determining a surrogate model 2 for calculating LAR; and an operational step 3, where the surrogate model produced in step 2 is used in deciding whether to launch the weapon at a target.

In order to calculate the LAR of a missile it may be necessary to approximate four functions associated with a given engagement situation: IR-Outer, IR-Inner, IZ-Outer and IZ-Inner. IR refers to 'in-range' and denotes the weapon attainability boundary for an engagement with no explicit user specified constraints. IZ refers to 'in-zone' which may further include user specified constrains such as demanded missile impact heading, cruise altitude, specified way-points and run-in distance. This example will consider the calculation of one of these functions, but it will be appreciated that a similar process may be applied to the other functions. It will be appreciated that different parameters may be used in the calculation of different functions. The parameter R to be approximated may be formulated as a function LAR of the parameters $\theta$, H, $\upsilon$, $\phi$ as follows:

$$R = LAR(\theta, H, \upsilon, \phi)$$

Where $\theta$ is the angle of launch position with respect to the target (deg), H is the launch altitude (m), $\upsilon$ is the launch speed (m/s) and $\phi$ is the pitch/dive angle at impact (deg). In the training data generation step 1, a range of values for each of the parameters $\theta$, H, $\upsilon$, $\phi$ are input to a kinematic model. The kinematic model is then run multiple times 4 with different combinations of parameter values to produce a set of training data 6 and a set of validation data 8 describing the variation of R over the parameter space.

In the surrogate model production step 2, the training data 6 is prepared 10. This comprises formatting the functional data from the kinematic model into pairs of input parameters (i.e. one combination of inputs X=($\theta$, H, $\upsilon$, $\phi$) and the corresponding function value R(X)). This data sets represents noisy and sparse observations of the true continuous underlying LAR function. After preparation the training data is input into a FITC algorithm (Fully Independent Training Conditional approximation as described in "A unifying View of Sparse Approximate Gaussian Process Regression" by Quinonero-Candela J. & Rasmussen C. E., Journal of Machine Learning Research, Vol. 6, pp 1939-1959, 2005, available as part of GPML Matlab Code version 4.0). In the FITC approach the pseudo or inducing-points u are treated as hyper-parameters to be optimised. Thus, the LAR approximation requires the following hyper-parameters 14 to be generated;

$$\lambda_\theta, \lambda_H, \lambda_\upsilon, \lambda_\phi, \sigma_f, X_u, w$$

Where $\lambda_\theta, \lambda_H, \lambda_\upsilon, \lambda_\phi$, are length-scale parameters learned during training, $\sigma_f$ is an overall scale factor determined from training, $X_u$ represents the induction points determined in training and w represents a weighted output value, one per induction point, derived from the covariance function (see below) and $\sigma_n$ (the noise parameter). These hyper-parameters 14 are calculated 12 using the FITC algorithm and a squared exponential covariance function 15 with Automatic Relevance Detection (ARD). Once calculated 12, the hyper-parameters 14 are passed to an evaluation step 18 which compares the predicted values calculated using a covariance function employing those parameters 14 with the validation data 8 to verify that the resulting surrogate model is sufficiently accurate. The covariance function 15 corresponding to the GP and hyper-parameters 14 are then incorporated 16 into a playback algorithm 19, for use in stage 3. Stages 1 and 2 of the method are carried out 'off-line', and separate from any weapons platform.

To calculate R the following covariance function is used:

$$R^* = K(x_u, x^*) \cdot w$$

Where K( ) is the squared-exponential covariance function:

$$\operatorname{cov}(f((x_u)_i), f(x_j^*)) = K((x_u)_i, x_j^*; \theta)$$
$$= \sigma_f^2 \cdot \exp\left(-\frac{1}{2}((x_u)_i - x_j^*)^T \cdot \operatorname{diag}(\lambda^2)^{-1} \cdot ((x_u)_i - x_j^*)\right)$$
$$\text{for } \forall \{i, j\}$$

and $\theta = \{\sigma_f, \lambda_1, \lambda_2, \ldots\}$ are the learned amplitude and length-scale hyper-parameters, $(x_u)_i$ $1 \leq i \leq m$ is the $i^{th}$ induction point, $x_j^*$ $1 \leq j \leq p$ is the $j^{th}$ input/test point, p is the number of test points, $\sigma_f$ is the scale factor parameter determined from training, and $\lambda^2 = (\lambda_\theta^2, \lambda_H^2, \lambda_\upsilon^2, \lambda_\phi^2)$.

During flight operations 3, the playback algorithm 19 embodying the covariance function 15 and hyper-parameters 14 is used to calculate 20 the function R at any given instant. The other functions required to calculate the LAR are similarly calculated. The prediction of the LAR is continually updated as engagement conditions change and this information is provided to the pilot who uses that information to decide 22 whether to launch 24 the missile against a given target.

In testing the FITC algorithm was found to give ~±50 m Root Mean Square (RMS) errors (with all better than 400 m absolute error) when the number of induction points is ~10% of the number of training data points, and ~±330 m RMS (with all better than 2 km absolute worst error) when the number of induction points is ~2.5% of the number of training data points. Depending on where the 'acceptable' accuracy was defined, this allows a trade-off in playback speed in the range 20 kHz-88 kHz for estimation of the LAR vertices (equivalent to ~1 to 4 Kilo-LARs/second) when using MATLAB 2012b on an HP840 Laptop equipped with an intel core i5-4300U@1.9/2.9 GHz-Boost CPU and executing on a single thread with no other applications running.

Figure 2:
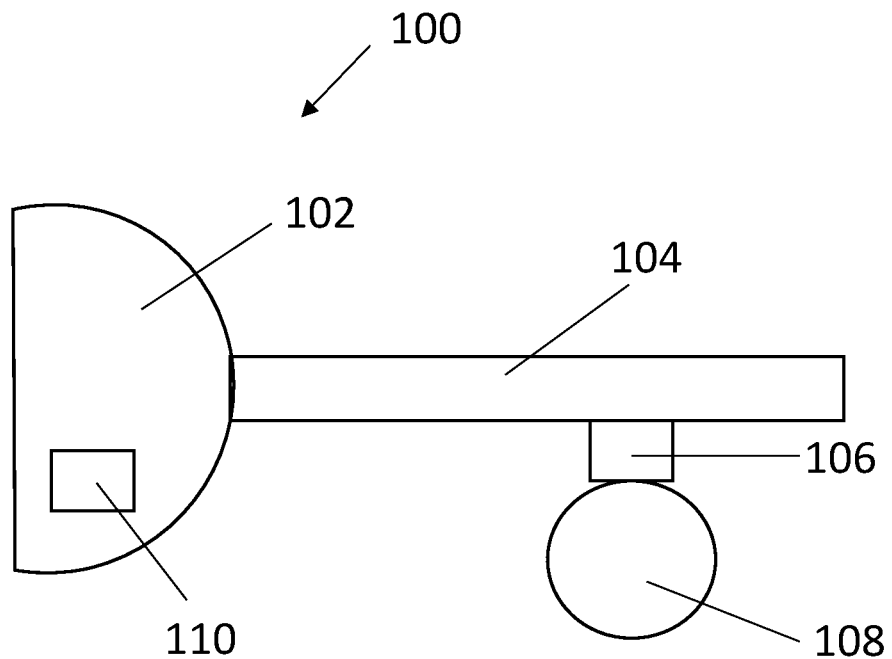
FIG. 2 shows part of a weapons platform configured for use with the process of the first embodiment.

FIG. 2 shows part of an aircraft 100 for use with the method of the first embodiment. The aircraft 100 has a fuselage 102 and a wing 104, and a missile 108 mounted on a launcher 106 located on the underside of the wing 104. A processor 110 programmed with the playback algorithm 19 embodying the covariance function 15 and having access to the hyper-parameters 14 is located within the fuselage 102 and forms part of the command and control (C2) system (not shown) of the aircraft 100. In use, data representing the current conditions and location of the aircraft 100 and a target (not shown) is provided to the processor 110 which uses the covariance function 15 and hyper-parameters 14 to calculate the LAR for that target. The LAR is provided to the pilot who then uses that information in deciding whether to launch the missile 108 as discussed above. In other embodiments, the missile may be located in a bomb bay, internal to the aircraft.

Figure 3:
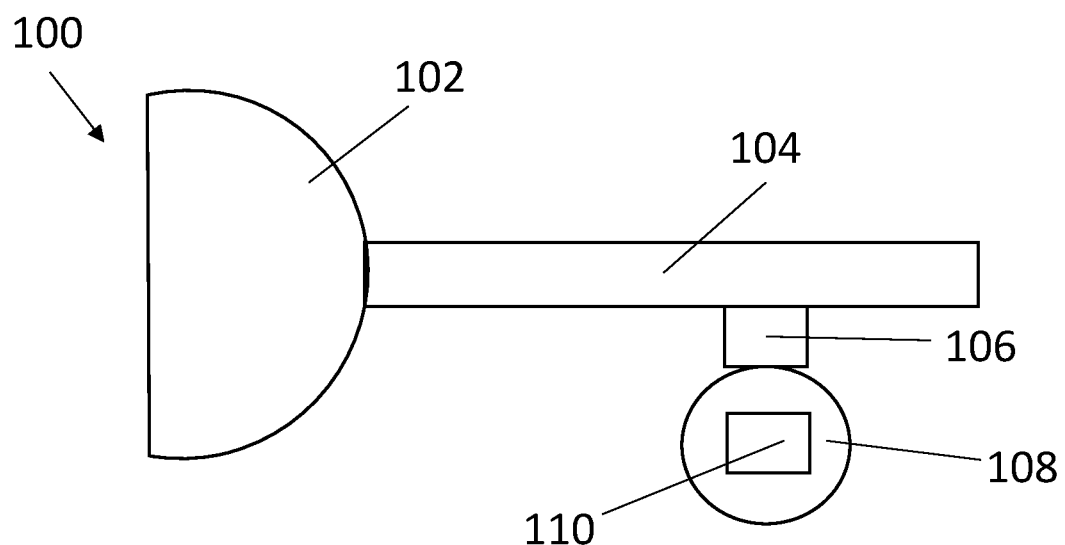
FIG. 3 shows part of a weapons platform configured for use with the process of the first embodiment.

FIG. 3 shows a variation of the arrangement of FIG. 2. The same reference numerals denote substantially similar elements. Only those aspects of FIG. 3 which differ significantly from the FIG. 2 arrangement will be discussed. In the arrangement of FIG. 3 the processor 110 is located within the missile 108 and provides a LAR to the aircraft command and control (C2) system (not shown) which relays this information to the pilot. As the covariance function 15 and hyper-parameters 14 are provided with the missile 108, weapons systems in accordance with the present example embodiment may facilitate interoperability and maintenance as there is no need to update on-board software to reflect changes in missile performance; this information is provided as part of the missile itself through the hyper-parameters 14 and covariance function 15.

Figure 4:
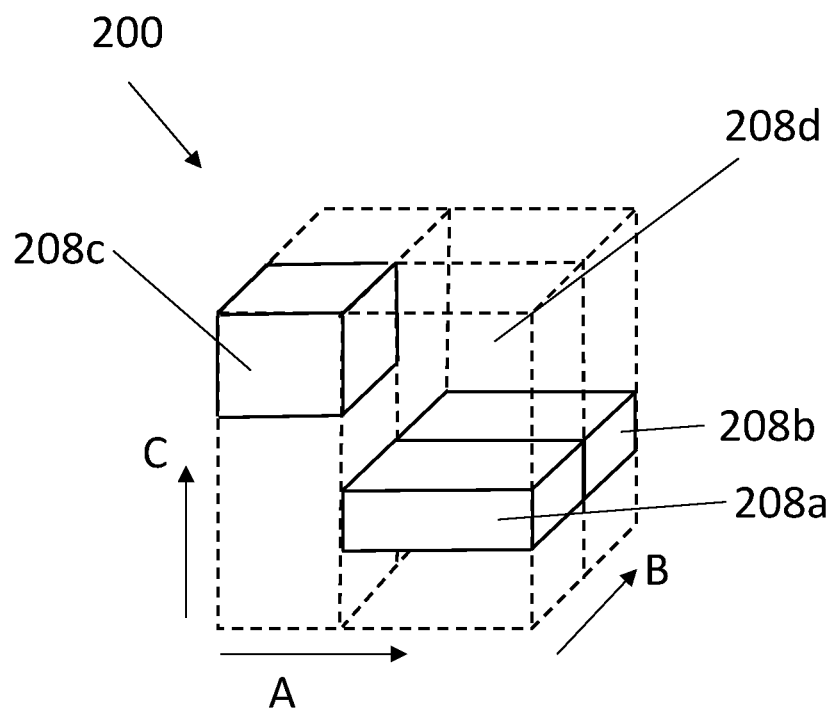
FIG. 4 shows a schematic view of a parameter space for use in a method according to a second embodiment of the invention.

In a variation of the process of FIG. 1 more than one set of training data may be generated at step 4; each set of training data corresponding to a different zone within the engagement parameter space. FIG. 4 shows a schematic depiction of a cuboidal parameter space 200, with a first parameter A increasing along the x-axis, a second parameter B increasing along the y-axis and a third parameter C increasing along the z-axis. The parameter space 200 has been divided into four zones 208a, 208b, 208c and 208d. Each of the zones 208a, 208b, 208c occupies a separate volume of the cuboidal space 200, with the fourth zone 208d representing the space not falling within the first three zones 208a, 208b, 208c. The first zone 208a is immediately adjacent to the second zone 208b. The third zone is spaced apart from both the first zone 208a and the second zone 208b. The training data for a given zone is generated using combinations of parameters falling within, and immediately adjacent to, the zone. Thus, a set of training data 6a and verification data 8a is obtained for zone 208a and so on for each of zones b to d. Each set of training data is then prepared and the FITC algorithm used to produce a set of hyper-parameters (including inducing points) for each zone. If the behaviour of the missile is different between different zones then the variables describing the LAR may differ leading to different sets of hyper-parameters for each zone. A different covariance function may also be used for each zone. Each covariance function 15 and set of hyper-parameters 14 may then be passed to the aircraft 100 for use in operations 3. In flight, the step of predicting the LAR using the covariance function 15 may first comprise identifying which zone the currently observed parameters are located in. The covariance function 15 and hyper-parameters 14 are then used to predict the LAR. Methods in accordance with the present embodiment may further reduce the amount of computation that must be carried out by the weapons system as only the inducing-points u relating to the current zone need be considered during the playback calculation.

In a further variation, different correction factors may be applied to each of the different zones 208. For example, if in use, the missile performance is found to be different from that predicted in a given zone 208, the results produced by the covariance function 15 corresponding to that zone may be scaled accordingly. In contrast to prior art methods where this would have required a reworking of the kinematic model and consequently significant reprogramming of the weapons system, the present embodiment allows such scaling to be carried out by varying a single 'correction' parameter. Accordingly, systems using the present embodiment may be more flexible and easier to update than prior art systems.

Figure 5:
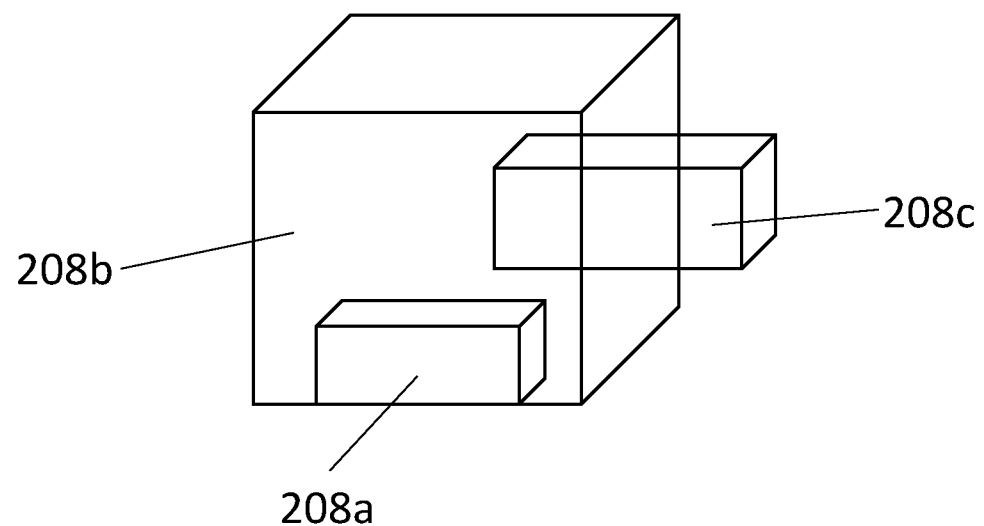
FIG. 5 shows a schematic view of a parameter space for use in a method according to a third embodiment of the invention.

FIG. 5 shows a variation of the parameter space 200 and zones 208 of FIG. 4. The same reference numerals denote substantially similar elements. Only those aspects of FIG. 5 which differ significantly from FIG. 4 will be discussed. In FIG. 4, each of the four zones 208 occupies a different region of the parameter space 200. In FIG. 5, three zones 208a to c are shown, and the first zone 208a overlaps with and is contained completely within a second zone 208b. A third zone 208c partially overlaps with zone 208b at a location spaced apart from zone 208a. Use of such zones may allow performance of the missile to be limited in a particular region, for example if missile launch in zone 208a posed unacceptable risks, the output of the covariance function 15a could be scaled such that a LAR is rarely achievable within this zone. In use, a list giving the order in which zones are to be investigated in order to identify whether a given parameter combination is located within that zone is passed to the weapon system along with the covariance function 15 and hyper parameters 14. For example, a point in zone 208a is also geometrically in zone 208b, thus the algorithm must check whether a point is in zone 208a before considering if the point is in zone 208b in order for the zone 208a model to be used.

Whilst the present invention has been described and illustrated with reference to particular embodiments, it will be appreciated by those of ordinary skill in the art that the invention lends itself to many different variations not specifically illustrated herein. By way of example only, certain possible variations will now be described. The above example has been described in the context of a missile mounted on an aircraft, it will be appreciated that the systems and methods described above are equally applicable to sea or land based systems, for example to ships and/or land vehicles and other weapons types. The FITC algorithm discussed above has been found particularly advantageous as it allows the generation of an approximation to full covariance based on m optimised pseudo- or inducing-points u, where m<N (and frequently m≪N), where N is the number of points in the training data set. With FITC the training complexity is of $O(N \cdot m^2)$ and playback scales with $O(m)$, this is in contrast with exact inference where the training complexity is of $O(N^3)$ and playback scales with $O(N)$. However it will be appreciated that other GP algorithms may also be used. For example the Subset of Data (SD), Fast-Forward Selection (FFS) and Nystrom algorithms may, in some circumstances, be useful. These algorithms are also described in "A unifying View of Sparse Approximate Gaussian Process Regression" by Quinonero-Candela J. & Rasmussen C. E., Journal of Machine Learning Research, Vol. 6, pp 1939-1959, 2005. Finally, the applicability zones are discussed above in the context of a three-dimensional space, it will be appreciated that the parameter space, and therefore the applicability zones, may be of a higher dimensionality.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A mission planning method for use with a weapon, the method comprising the steps of:
   obtaining a first training data set describing the performance of the weapon;
   using the first training data set and a Gaussian Process (GP) to obtain a first surrogate model giving a functional approximation of the performance of the weapon, the Gaussian process comprising using a covariance function to calculate a set of hyper-parameters and a set of weighted values; and
   providing the first surrogate model to a weapons system for use in calculating a performance characteristic of the weapon during combat operations.

2. A mission planning method according to claim 1, wherein the surrogate model further comprises a set of inducing points.

3. A mission planning method according to claim 1, wherein the Gaussian Process algorithm used is the Fully Independent Training Conditional (FITC) algorithm.

4. A mission planning method according to claim 1, further comprising calculating a performance characteristic of the weapon during combat operations using the surrogate model.

5. A mission planning method according to claim 4, further comprising initiating launch of the weapon in dependence on the performance characteristic so calculated.

6. A mission planning method according to claim 1, the method comprising the steps of:
   obtaining a second training data set describing the performance of the weapon in a second, different, parameter space to the first training data set;
   using the second training data set and a Gaussian Process (GP) or Neural Network to obtain a second, different, surrogate model giving a functional approximation of the performance of the weapon in the second parameter space;
   providing the first and second surrogate models to a weapons system for use in calculating a performance characteristic of the weapon during combat operations.

7. A mission planning method according to claim 6, further comprising, during combat operations, selecting the first or second surrogate model in dependence on the current parameters and using the surrogate model so selected to calculate a performance characteristic of the weapon.

8. A mission planning method according to claim 1, wherein the weapon is a missile.

9. A mission planning method according to claim 1, wherein the weapon system comprises a weapons platform and the weapons platform is an aircraft, ship or land vehicle.

10. A mission planning method according to claim 1, wherein the performance characteristic is the Launch Success Zone (LSZ), the Launch Acceptable Region (LAR), the footprint, the aerodynamic drag of the weapon and/or the trajectory of an enemy weapon.

11. A weapons system comprising a processor programmed with software configured to calculate a performance characteristic of a weapon of the weapons system during combat operations using a functional approximation of the performance of the weapon, said functional approximation comprising a surrogate model produced using a Gaussian Process, the Gaussian process comprising using a covariance function to calculate a set of hyper-parameters and a set of weighted values.

12. A weapons system according to claim 11, further comprising a launcher, and wherein the launcher comprises the processor.

13. A weapon configured for use as the weapon of the weapons system of claim 11, wherein the weapon comprises the processor.

14. A weapons system according to claim 11, further comprising a weapons platform, wherein the processor is part of the command and control system of the weapons platform.

15. A computer software product for loading onto a processor associated with a weapons system, wherein the software product is configured to calculate a performance characteristic of a weapon of the weapons system during combat operations using a functional approximation of the performance of the weapon, said functional approximation comprising a surrogate model produced using a Gaussian Process, the Gaussian process comprising using a covariance function to calculate a set of hyper-parameters and a set of weighted values.

16. A computer software product according to claim 15, wherein the surrogate model is produced using a Gaussian Process and the surrogate model comprises a covariance function, a set of hyper-parameters and a set of weighted values.

* * * * *